United States Patent
Zeiler et al.

(10) Patent No.: US 11,626,642 B2
(45) Date of Patent: Apr. 11, 2023

(54) MODULAR BATTERY ASSEMBLY FOR BATTERY POWERED EQUIPMENT

(71) Applicant: Briggs & Stratton, LLC, Wauwatosa, WI (US)

(72) Inventors: Jeff Zeiler, Wauwatosa, WI (US); Christopher Krajewski, West Allis, WI (US); Kyle Harvey, Wauwatosa, WI (US); Ryan Jaskowiak, Mukwonago, WI (US); Nicholas Zeidler, Wauwatosa, WI (US); Mark Noller, Wauwatosa, WI (US); Todd Johnson, Wauwatosa, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 63 days.

(21) Appl. No.: 17/051,486

(22) PCT Filed: May 2, 2019

(86) PCT No.: PCT/US2019/030417
§ 371 (c)(1),
(2) Date: Oct. 29, 2020

(87) PCT Pub. No.: WO2019/213407
PCT Pub. Date: Nov. 7, 2019

(65) Prior Publication Data
US 2021/0057694 A1    Feb. 25, 2021

Related U.S. Application Data

(60) Provisional application No. 62/667,209, filed on May 4, 2018.

(51) Int. Cl.
*H01M 50/20* (2021.01)
*H01M 10/613* (2014.01)
(Continued)

(52) U.S. Cl.
CPC ............. *H01M 50/20* (2021.01); *B60L 50/64* (2019.02); *B60L 53/80* (2019.02); *B60L 58/22* (2019.02);
(Continued)

(58) Field of Classification Search
CPC .... H01M 50/20; H01M 10/46; H01M 10/482; H01M 10/613; H01M 10/655;
(Continued)

(56) References Cited

U.S. PATENT DOCUMENTS

| 5,401,591 A | 3/1995 | Bishay et al. |
| 6,168,881 B1 | 1/2001 | Fischer et al. |

(Continued)

FOREIGN PATENT DOCUMENTS

| CN | 109244304 | 1/2019 | | |
| DE | 102017123102 A1 * | 5/2018 | ........... | B23B 49/003 |

(Continued)

OTHER PUBLICATIONS

Foreign Search Report on International Appl. No. PCT/US2019/030417, dated Jul. 19, 2019, 17 pps.

(Continued)

*Primary Examiner* — M Baye Diao
(74) *Attorney, Agent, or Firm* — Foley & Lardner LLP

(57) ABSTRACT

A battery assembly including a battery pack having a battery pack housing, an upper modular housing portion coupled to the battery pack housing positioned at a first end of the battery pack housing, a lower modular housing portion coupled to the battery pack housing positioned at a second end of the battery pack housing, and a handle formed as part of the upper modular housing portion. The battery assembly further includes multiple battery cells disposed within the battery pack housing, a mating feature including multiple ports electrically connected to the multiple battery cells and (Continued)

structured to supply power from the multiple battery cells through the ports and is structured to selectively connect the battery assembly with a receptacle of at least one of a piece of power equipment and a charging station. The mating feature is located on the first modular housing portion.

18 Claims, 10 Drawing Sheets

(51) Int. Cl.

| | |
|---|---|
| *H01M 10/655* | (2014.01) |
| *B60L 50/64* | (2019.01) |
| *B60L 58/22* | (2019.01) |
| *B60L 53/80* | (2019.01) |
| *B60L 58/26* | (2019.01) |
| *H02J 7/00* | (2006.01) |
| *H01M 50/256* | (2021.01) |
| *H01M 10/46* | (2006.01) |
| *H01M 10/48* | (2006.01) |

(52) U.S. Cl.
CPC ............ *B60L 58/26* (2019.02); *H01M 10/46* (2013.01); *H01M 10/482* (2013.01); *H01M 10/613* (2015.04); *H01M 10/655* (2015.04); *H01M 50/256* (2021.01); *H02J 7/0013* (2013.01); *H02J 7/0045* (2013.01); *H02J 7/0048* (2020.01); *H01M 2220/20* (2013.01)

(58) Field of Classification Search
CPC ........... H01M 50/256; H01M 2220/20; H01M 10/488; H01M 10/6235; H01M 50/296; H01M 50/284; H01M 50/247; H01M 50/262; H01M 50/204; H01M 2220/30; B60L 50/64; B60L 53/80; B60L 58/22; B60L 58/26; H02J 7/0013; H02J 7/0045; H02J 7/0048; Y02E 60/10; Y02T 10/70; Y02T 10/7072
USPC ........................................................ 320/112
See application file for complete search history.

(56) References Cited

U.S. PATENT DOCUMENTS

| | | | | |
|---|---|---|---|---|
| 7,510,797 B2* | 3/2009 | Aker | ................... | H01M 50/253 429/50 |
| 8,092,932 B2 | 1/2012 | Phillips et al. | | |
| 8,415,046 B2 | 4/2013 | Kondo | | |
| 8,653,786 B2* | 2/2014 | Baetica | ................... | A01D 34/58 56/11.9 |
| 8,872,474 B2* | 10/2014 | Scheucher | .............. | B60L 58/13 320/112 |
| 9,316,964 B2 | 4/2016 | Yamaguchi et al. | | |
| 9,385,351 B2 | 7/2016 | Workman et al. | | |
| 9,537,336 B2 | 1/2017 | Suzuki et al. | | |
| 9,783,076 B2 | 10/2017 | Li | | |
| 10,147,979 B2* | 12/2018 | Zeller | ................. | H01M 50/296 |
| 10,211,488 B2* | 2/2019 | Willgert | ................... | H02J 7/005 |
| 10,327,392 B2 | 6/2019 | Conrad et al. | | |
| 10,347,954 B2 | 7/2019 | Rief et al. | | |
| 10,833,300 B2* | 11/2020 | Verhaag | ................. | H01M 50/213 |
| 10,916,743 B2 | 2/2021 | Pellenc et al. | | |
| 11,136,956 B2 | 10/2021 | Gilpatrick et al. | | |
| 11,165,104 B2* | 11/2021 | Funk | ................. | H01M 10/4207 |
| 2007/0236179 A1 | 10/2007 | Roehm et al. | | |
| 2010/0275564 A1 | 11/2010 | Baetica et al. | | |
| 2012/0135293 A1 | 5/2012 | Gu et al. | | |
| 2014/0154535 A1 | 6/2014 | Olsson et al. | | |
| 2015/0122562 A1 | 5/2015 | Miyashiro | | |
| 2015/0137758 A1 | 5/2015 | Taga et al. | | |
| 2016/0099590 A1 | 4/2016 | Velderman et al. | | |
| 2017/0306916 A1 | 10/2017 | Zeiler et al. | | |
| 2019/0058337 A1* | 2/2019 | Wolfram | ............... | H02J 7/0013 |
| 2019/0075724 A1 | 3/2019 | Becke et al. | | |
| 2020/0154962 A1* | 5/2020 | Fie | ..................... | H01M 10/6563 |
| 2021/0116911 A1* | 4/2021 | Pjevach | ............... | H01M 50/204 |

FOREIGN PATENT DOCUMENTS

| | | | | |
|---|---|---|---|---|
| DE | 10 2018 103 767 A1 | 8/2018 | | |
| EP | 1035599 A1 * | 9/2000 | .......... | H01M 10/613 |
| EP | 1 925 405 A | 5/2008 | | |
| EP | 2 099 085 | 9/2009 | | |
| EP | 2 424 001 | 2/2012 | | |
| EP | 3 367 464 | 8/2018 | | |
| JP | 2009-277504 | 11/2009 | | |
| JP | 2010-212165 | 9/2010 | | |
| JP | 2016-038983 A | 3/2016 | | |
| WO | WO-2012/178205 A2 | 12/2012 | | |
| WO | WO-2015/134884 A1 | 3/2015 | | |
| WO | WO-2018/031719 A1 | 2/2018 | | |
| WO | WO-2018/094792 A1 | 5/2018 | | |
| WO | WO-2019/213407 A1 | 11/2019 | | |
| WO | WO-2020/131393 A1 | 6/2020 | | |

OTHER PUBLICATIONS

Foreign Search Report on International Appl. No. PCT/US2020/024981, dated Aug. 12, 2019, 13 pps.
Foreign Search Report on International Appl. No. PCT/US2019/055785, dated Oct. 11, 2019, 15 pps.

* cited by examiner

US 11,626,642 B2

MODULAR BATTERY ASSEMBLY FOR BATTERY POWERED EQUIPMENT

CROSS-REFERENCE TO RELATED PATENT APPLICATIONS

This application is a National Stage of International Application No. PCT/US2019/030417, filed May 2, 2019, which claims the benefit of U.S. Application No. 62/667,209, filed May 4, 2018, both of which are incorporated herein by reference in entirety their entireties.

BACKGROUND

The present invention generally relates to the field of indoor and outdoor power equipment, and in particular, to the field of battery powered indoor and outdoor power equipment.

SUMMARY

One embodiment of the invention relates to a battery assembly. The battery assembly includes a battery pack having a battery pack housing, an upper modular housing portion coupled to the battery pack housing positioned at a first end of the battery pack housing, a lower modular housing portion coupled to the battery pack housing positioned at a second end of the battery pack housing. The battery assembly further includes a handle formed as part of the upper modular housing portion, multiple battery cells disposed within the battery pack housing, a mating feature including multiple ports electrically connected to the multiple battery cells and structured to supply power from the multiple battery cells through the ports. The mating feature is also structured to selectively connect the battery assembly with a receptacle of at least one of a piece of power equipment and a charging station. The mating feature is located on the first modular housing portion.

Another embodiment of the invention relates to a battery charging system. The battery charging system includes a charging station having multiple receptacles and multiple battery assemblies. Each of the multiple battery assemblies includes a housing including a handle, multiple battery cells disposed within the housing, and a mating feature integrally formed with the housing. The mating feature is structured to selectively couple the battery assembly with the receptacle of the charging station and includes a plurality of ports electrically connected to the plurality of battery cells and structured to receive power from the charging station to charge the plurality of battery cells. The handle includes a movable member structured to selectively disengage the battery assembly from the plurality of receptacles of the charging station.

Another embodiment of the invention relates to a battery assembly. The battery assembly includes a housing comprising a first portion, a second portion, and a third portion connecting the first portion to the second portion, wherein the second portion is located opposite the first portion. The battery assembly further includes a handle located above the first portion, multiple battery cells disposed within the housing, a mating feature including multiple ports electrically connected to the multiple battery cells and structured to supply power from the multiple battery cells through the ports and is structured to selectively connect the battery assembly with a receptacle of at least one of a power equipment and a charging station. The mating feature is located on the first portion of the housing.

BRIEF DESCRIPTION OF THE DRAWINGS

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
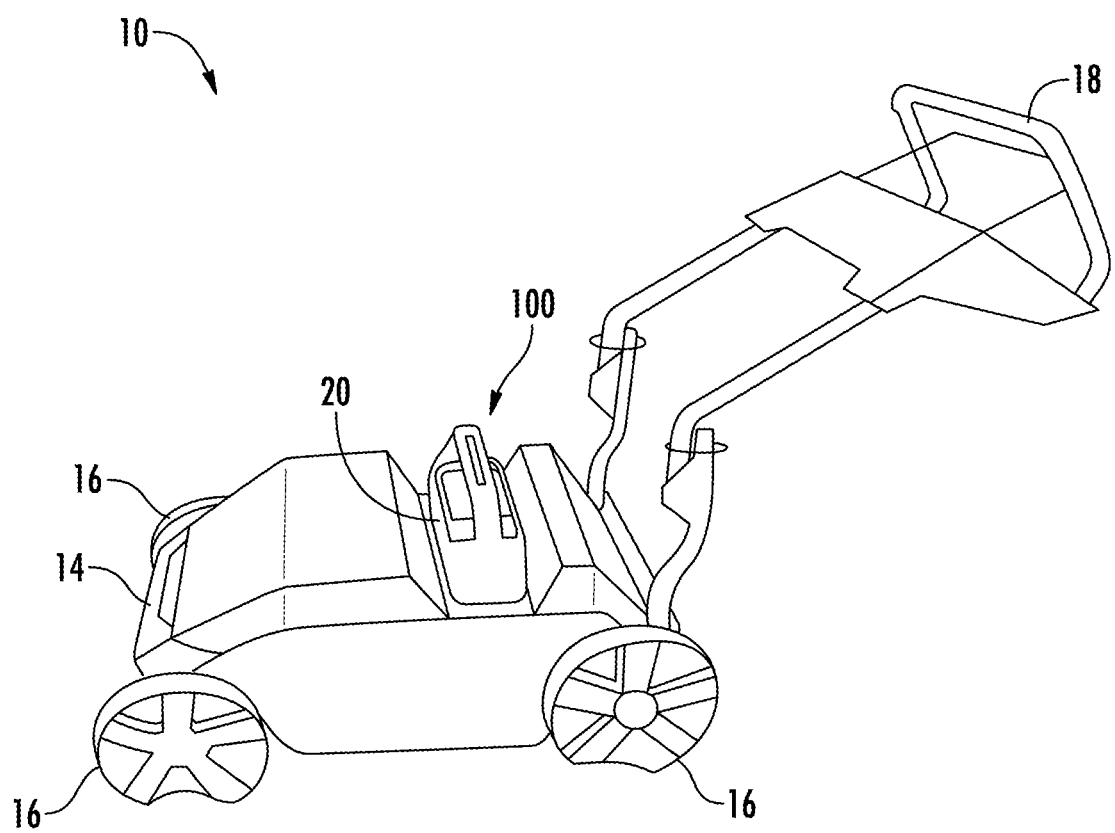
FIG. 1 is a perspective view of a lawn mower, according to an exemplary embodiment.

Referring to FIG. 1, outdoor power equipment, in the form of a lawn mower 10, is shown according to an exemplary embodiment. The lawn mower 10 includes a removable and replaceable battery assembly 100 powering an electric motor (not shown) coupled to a rotary tool, such as the blade in a deck 14 of the lawn mower 10, an auger, a saw, tines, a drill, a pump, or other rotary tools. As shown, the lawn mower 10 further includes wheels 16 and a rearward extending handle 18 designed to be pushed by an operator walking behind the lawn mower 10. The battery assembly 100 described herein also allows electrically powered equipment to be used indoors. The battery assembly 100 can be used with various types of indoor and outdoor power equipment, as well as with portable jobsite equipment. Outdoor power equipment includes lawn mowers, riding tractors, snow throwers, pressure washers, tillers, log splitters, zero-turn radius mowers, walk-behind mowers, riding mowers, stand-on mowers, pavement surface preparation devices, industrial vehicles such as forklifts, utility vehicles, commercial turf equipment such as blowers, vacuums, debris loaders, overseeders, power rakes, aerators, sod cutters, brush mowers, portable generators, etc. Indoor power equipment includes floor sanders, floor buffers and polishers, vacuums, etc. Portable jobsite equipment includes portable light towers, mobile industrial heaters, and portable light stands.

Figure 2:
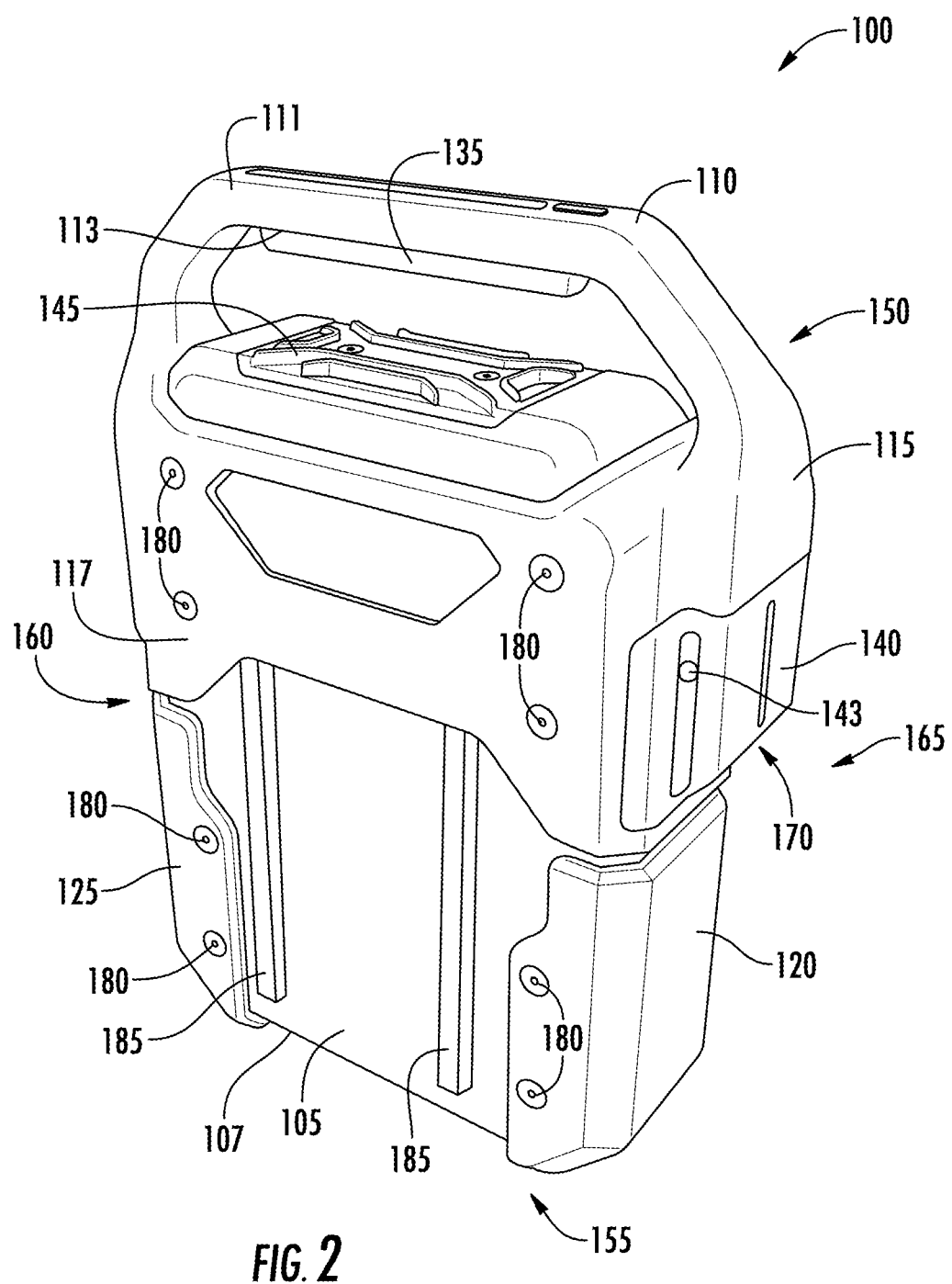
FIG. 2 is a perspective view of a battery assembly for use with various types of indoor and outdoor power equipment, according to an exemplary embodiment.

Referring to FIG. 2, the battery assembly 100 is shown, according to an exemplary embodiment. The battery assembly 100 is removable and rechargeable. The battery assembly 100 is configured to be inserted (e.g., dropped, lowered, placed) into a receiver integrated with a piece of equipment and/or a charging station. The battery assembly 100 can be installed into a piece of equipment vertically, horizontally, and at any angle. The battery assembly 100 includes a battery pack 105 and optionally, one or more modular portions as described below. The battery pack 105 is a Lithium-ion battery. However, other battery types are contemplated, such as nickel-cadmium (NiCD), lead-acid, nickel-metal hydride (NiMH), lithium polymer, etc. The battery assembly 100 yields a voltage of approximately 48 Volts (V) and 1500 Watt-hours (Wh) of energy. It is contemplated that battery assemblies of other sizes may also be used. The battery pack 105 includes one or more battery cells positioned therein. The battery assembly 100 is also hot-swappable meaning that a drained battery assembly 100 can be exchanged for a new battery assembly 100 without completely powering down connected equipment. As such, downtime between battery assembly 100 exchanges is eliminated.

The battery assembly 100 can be removed by an operator from a piece of equipment without the use of tools and recharged using a charging station, as described further herein. In this way, the operator may use a second rechargeable battery having a sufficient charge to power equipment while allowing the first battery to recharge. In addition, the battery assembly 100 can be used on various types of equipment including indoor, outdoor, and portable jobsite equipment. Due to its uniformity across equipment, the battery assembly 100 can also be used as part of a rental system, where rental companies who traditionally rent out pieces of equipment can also rent the battery assembly 100 to be used on such equipment. An operator can rent a battery assembly 100 to use on various types of equipment the operator may own and/or rent and then return the battery assembly 100 to be used by other operators on an as-needed basis.

Still referring to FIG. 2, the battery pack 105 includes an upper portion 150, a lower portion 155, a left side 160, and a right side 165. The battery assembly 100 further includes an upper modular portion 115 coupled to the upper portion 150 of the battery pack 105, and lower modular portions 120, 125 coupled to a lower portion 155 of the battery pack 105 on each of the left and right sides 160, 165. The upper modular portion 115 and lower modular portions 120, 125 are coupled to the battery pack 105 using fasteners 180 (e.g., bolts, screws). In other embodiments, the modular portions 115, 120, 125 are coupled to the battery pack 105 using a snap fit. The lower modular portions 120, 125 provide protection to the battery pack 105 and act to absorb or limit the amount of force the battery pack 105 endures by dropping, etc. In some embodiments, the battery assembly 100 may not include the upper modular portion 115 and/or lower modular portions 120, 125 and may be permanently mounted to a piece of equipment. The upper modular portion 115 and lower modular portions 120, 125 are exchangeable and customizable such that an operator may chose a different design and/or color based on the type or make and model of the equipment with which the battery assembly 100 is to be used.

Figure 3:
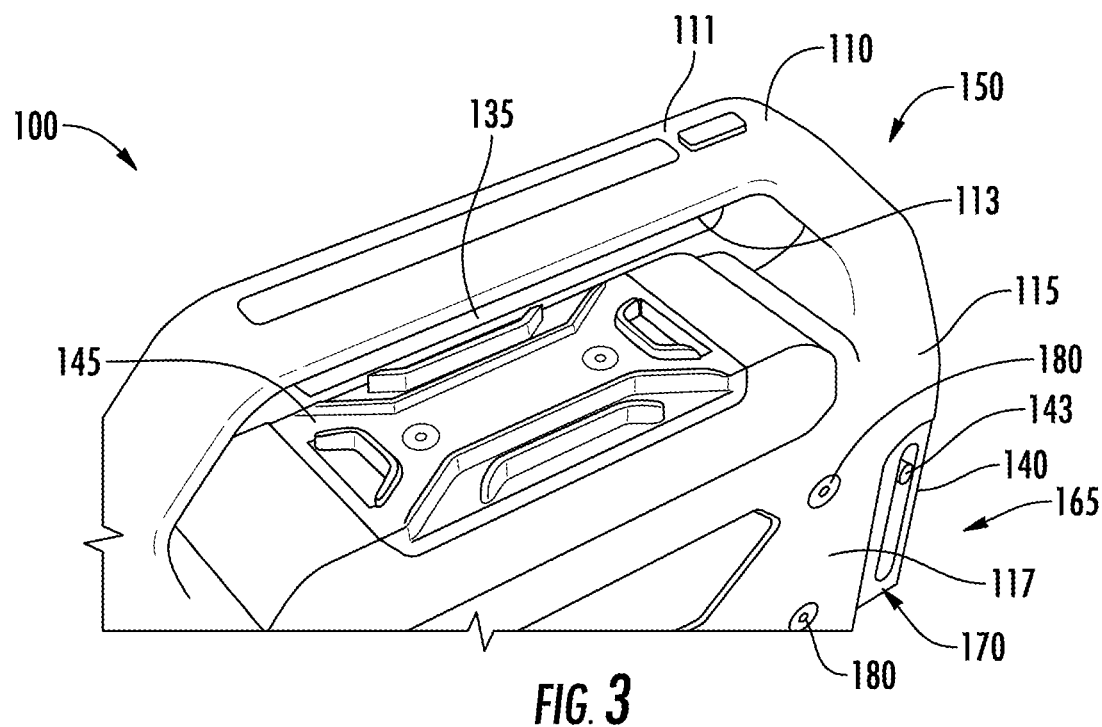
FIG. 3 is a perspective view of a portion of the battery assembly of FIG. 2.
Figure 4:
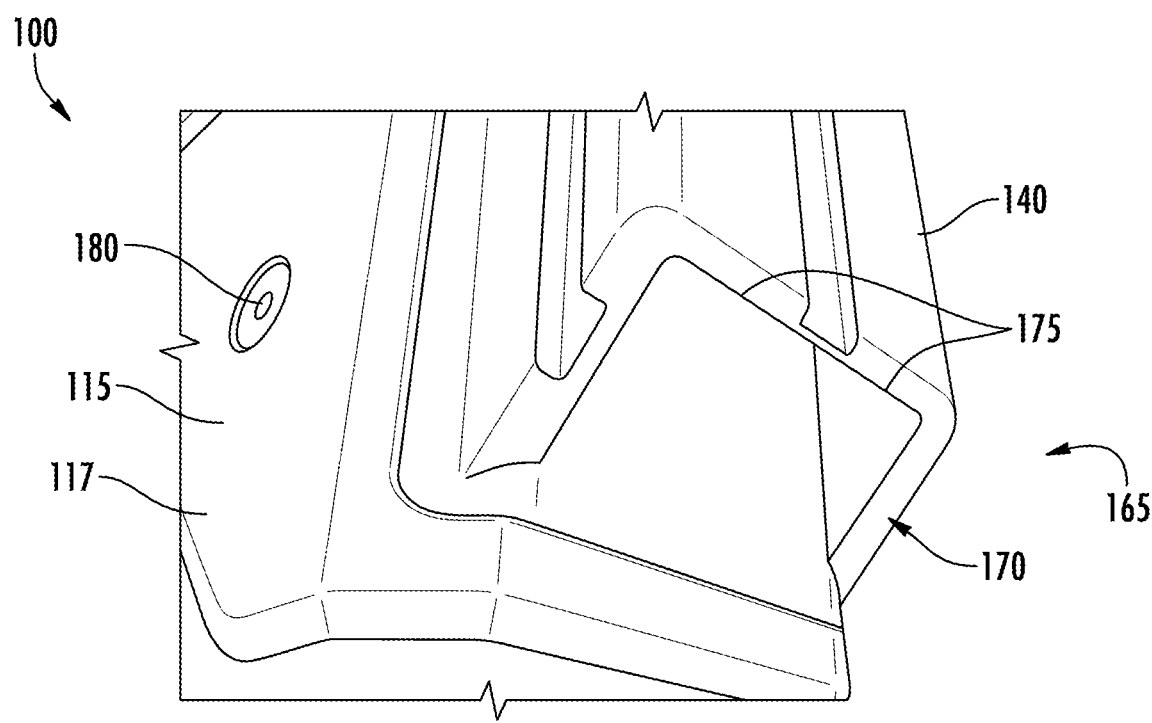
FIG. 4 is a perspective view of a portion of the battery assembly of FIG. 2.

Referring to FIGS. 2-4, the upper modular portion 115 includes a casing 117 and a handle 110 extending therefrom. The casing 117 surrounds the upper portion 150 of the battery pack 105. The casing 117 includes a mating feature 140 positioned proximate the right side 165 of the battery pack 105. The mating feature 140 includes an opening 170 having one or more ports 175 positioned therein. The ports 175 are configured to mate with a charging connector (not shown) on a charging station (e.g., charging systems 200, 400 in FIGS. 6-8). The ports 175 are electrically coupled to the battery cells within the battery pack 105. The mating feature 140 are configured to supply power from the battery cells through the ports 175 and selectively connect the battery assembly 100 with a receptacle of at least one of a piece of power equipment and a charging station. The mating feature 140 further includes a lock 143 (e.g., latch, clip) configured to couple and decouple (e.g., lock and unlock) the battery assembly 100 to a respective feature on a charging station and/or a piece of equipment.

The handle 110 includes an outer surface 111 and an inner surface 113 positioned nearer the battery pack 105 than the outer surface 111. The inner surface 113 includes a movable member 135 configured to be operable by the operator to unlock the battery assembly 100 from a charging station and/or a piece of equipment. When depressed, the movable member 135 moves inward toward the inner surface 113 and moves the lock 143 out of engagement with a respective feature on a charging station and/or piece of equipment. In this way, when an operator grasps the handle 110, the operator can, at the same time and with the same hand, easily depress the movable member 135 to disengage the battery assembly 100 from a piece of equipment or charging station.

Referring to FIG. 3, the battery pack 105 further includes a heat sink 145 formed therein proximate the upper portion 150 of the battery pack 105. The heat sink 145 acts to regulate the temperature of the battery pack 105 by transferring the heat generated from the battery pack 105 to a fluid medium (e.g., air) where the heat is then dissipated away from the battery pack 105. As shown in FIG. 3, the heat sink 145 is a cold plate heat sink, although other forms of heat sinks may be used.

Figure 5:
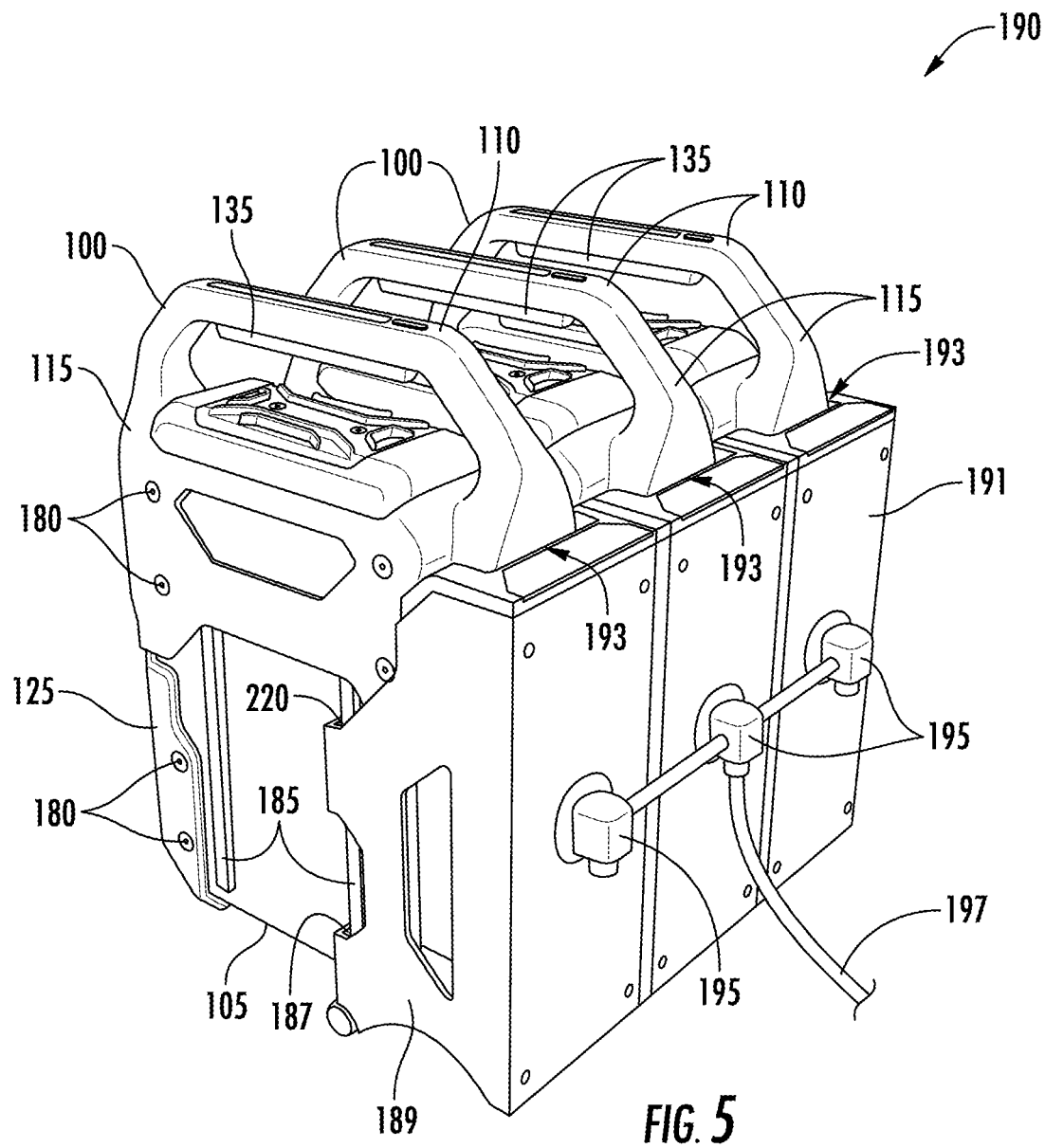
FIG. 5 is a perspective view of an integrated battery system including multiple battery assemblies of FIG. 2.

Referring to FIG. 5, multiple battery assemblies 100 can be used in an integrated battery system 190. An integrated battery system 190 can be used on a piece of equipment that requires more battery power than one battery assembly 100 provides. The integrated battery system 190 includes multiple battery receptacles 191 each having an opening 193. The battery receptacles 191 include partial walls 189 that include protrusions 187. The battery pack 105 includes one or more slots 185 (e.g., slits, niches) formed proximate the lower portion 155. The slots 185 are configured to engage the protrusions 187 (e.g., tabs) on the integrated battery system 190. The slots 185 and protrusions 187 are configured to engage with each other and align a battery pack 105 into each of the receptacles 191. A battery assembly 100 is slid into each of the battery receptacles 191 (e.g., each slot 185 receiving a protrusion 187) and connected via the mating feature 140 and ports 175 to a central power cord 197 via intermediate connectors 195 formed in the battery receptacles 191. The central power cord 197 may be connected to a charging station.

Figure 6:
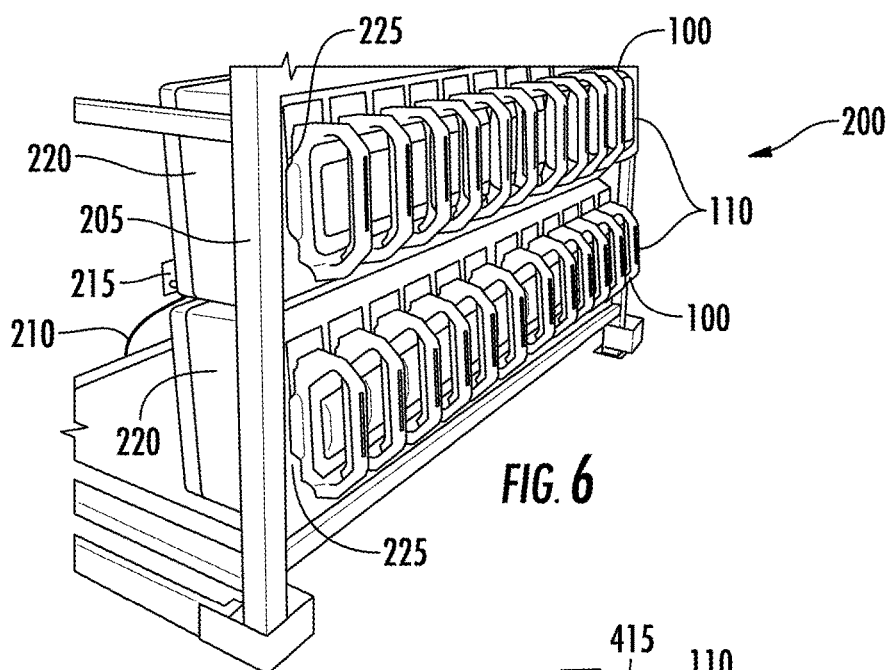
FIG. 6 is a perspective view of a rack charging system including multiple battery assemblies of FIG. 2.

Referring to FIG. 6, a rack charger system 200 is shown, according to one embodiment. The rack charger system 200 includes a rack 205 and one or more charging receivers 220 having battery receptacles 225. The one or more battery assemblies 100 are inserted into the battery receptacles 225 to be charged. When inserted, the battery assemblies 100 are electrically coupled to the charging receivers 220 (e.g., via ports 175 shown in FIG. 4) which are electrically coupled to a utility power source, such as an electrical cord 210 plugged directly into a wall outlet 215. In some embodiments, the charging receivers 220 may be configured to work with multiple types of utility power, as required. For example, the charging receivers 220 may be coupled to 120 VAC service, 240 VAC service, or even 480 VAC service to allow for multiple batteries to be charged. The rack charging system 200 may include power converters to transform the utility power to the proper voltage and current levels required to charge the one or more battery assemblies 100. The rack charging system 200 may further include one or more controllers configured to ensure proper charging of all the battery assemblies 100 received by the rack charger system 200. When an operator and/or employee desires to remove one of the battery assemblies 100, the handle 110 of the battery assembly 100 is grasped, the movable member 135 is engaged (e.g., squeezed, pushed in), the lock 143 (FIG. 1) is moved out of engagement with the battery receptacle 225, and the battery assembly 100 is removed by sliding the battery assembly 100 out of the receptacle 225. The battery assemblies 100 may also include visual indicators showing a battery charge level, etc. Using the rack charger system 200, the battery assembly 100 will fully charge in approximately 1 hour.

Figure 7:
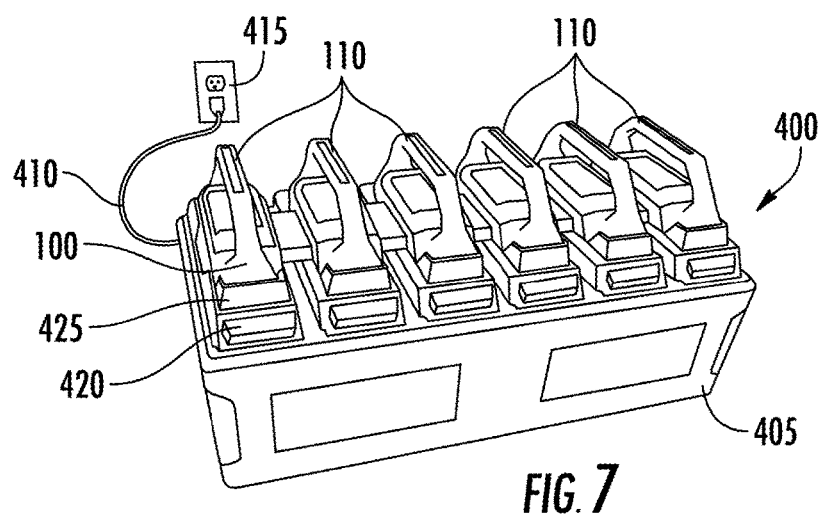
FIG. 7 is a perspective view of a bench top charging system including multiple battery assemblies of FIG. 2.

Referring to FIG. 7, a bench top charging system 400 is shown, according to an exemplary embodiment. The bench top charger system 400 includes a receptacle housing 405 having multiple battery receptacles 425. One or more battery assemblies 100 are inserted into the battery receptacles 425 to be charged. When inserted, the battery assemblies 100 are electrically coupled to the battery receptacles 425 (e.g., via ports 175 shown in FIG. 4), which are electrically coupled to a utility power source, such as an electrical cord 410 plugged directly into a wall outlet 415. When an operator and/or employee desires to remove one of the battery assemblies 100, the handle 110 of the battery assembly 100 is grasped, the movable member 135 (FIG. 2) is engaged (e.g., depressed, squeezed, pushed in), the lock 143 (FIG. 2) is moved out of engagement with the battery receptacle 425, and the battery assembly 100 is removed by sliding the battery assembly 100 out of the receptacle 425. Each battery assembly 100 includes a visual indicator or display 420 showing battery charge level, among other battery health indications. The visual indicator or display 420 may indicate different colors for different levels of battery charge. For example, the visual indicator or display 420 may use a red color to denote that the battery is not fully charged and a green color to denote that the battery is fully charged. Using the bench top charger system 400, the battery assembly 100 will fully charge in approximately 1 hour.

In some embodiments, the rack charger system 200 and/or the bench top charger system 400 use sequential charging while charging multiple battery assemblies 100. Sequential charging includes charging different battery assemblies 100 at different times so that not all battery assemblies 100 are charged at once potentially resulting in an overload on the utility service system. The sequential charging may determine which battery assemblies 100 need to be charged more than others by monitoring the charge levels of all connected battery assemblies 100 and supply charge to those assemblies 100 while switching off power supply to battery assemblies 100 that may already be fully charged.

Figure 8:
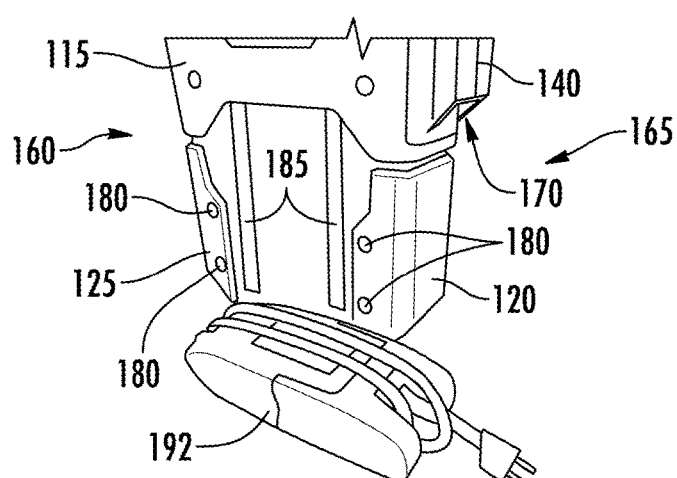
FIG. 8 is a perspective view of a battery assembly of FIG. 2 with a charging cord.

Referring to FIG. 8, a portable charger 192 for use with the battery assembly 100 is shown, according to one embodiment. The portable charger 192 is plugged into the ports 175 and into a wall outlet to provide charging to the battery assembly 100. Using the portable charger 192, the battery assembly 100 will fully charge in approximately 4 hours.

In addition to the charging systems described above, the battery assembly 100 can also be charged while inserted on the equipment or tool on which the battery assembly 100 is used. A user can leave the battery assembly 100 inserted and plug the equipment or tool into an outlet to charge the battery assembly 100. In this embodiment, the charging system is included with the tool or equipment such that no external charger is necessary.

Figure 9:
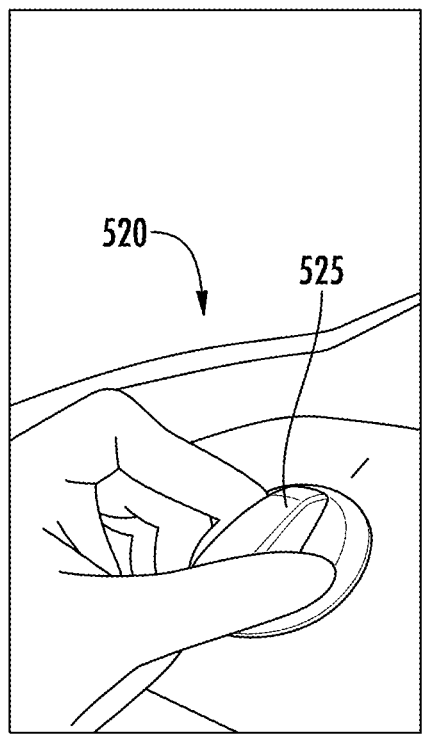
FIG. 9 is a perspective view of a portion of a user interface of a piece of outdoor power equipment.
Figure 10:
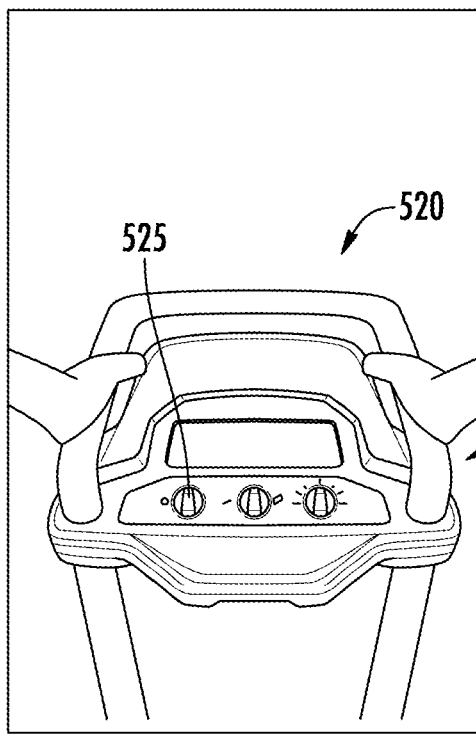
FIG. 10 is a front view of the user interface of FIG. 10.
Figure 11:
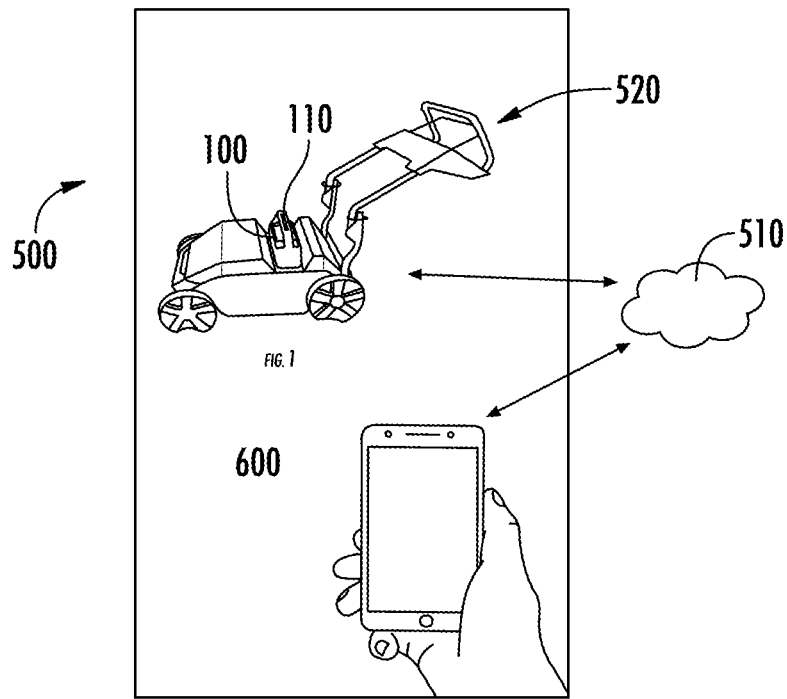
FIG. 11 is a perspective view of a communication system between a mobile device and the battery of FIG. 2, according to an exemplary embodiment.

Referring to FIGS. 9-11, a lawn mower 500 and a user interface 520 of the lawn mower 500 are shown. The user interface 520 includes a switch 525 (e.g., lever, knob, button, etc.). The switch 525 may rotate between an off position, where the battery assembly 100 is not electrically connected to components of the lawn mower 500, and an on position, where the battery assembly 100 is electrically connected to the components. As shown in FIG. 11, the battery assembly 100 is communicably coupled to a mobile device 600. The battery assembly 100 communicates various battery data and equipment data to the mobile device 600 for display.

Referring to FIG. 11, in some embodiments, the battery assembly 100 is connected to a network 510. In some embodiments, operators and/or employees communicate over the network 510 to the battery assembly 100 via mobile devices 600, such as smartphones, laptop computers, desktop computers, tablet computers, and the like. Accordingly, one or more mobile devices 600 are also connected to the network 510.

In some embodiments, the battery assembly 100 includes a network interface. In some arrangements, the network interface includes the hardware and logic necessary to communicate over multiple channels of data communication. For example, the network interface may include a Wi-Fi interface, a cellular modem, a Bluetooth transceiver, a Bluetooth beacon, an RFID transceiver, an NFC transceiver, or a combination thereof. The network interface facilitates data communication to and from the battery assembly 100 (and therefore the equipment (e.g., lawn mower 500) on which the battery assembly 100 is used).

Data communication between the battery assembly 100 and the mobile device 600 in various combinations may be facilitated by the network 510. In some arrangements, the network 510 includes cellular transceivers. In another arrangement, the network 510 includes the Internet. In yet another arrangement, the network 510 includes a local area network or a wide area network. The network 510 may be facilitated by short and/or long range communication technologies including Bluetooth transceivers, Bluetooth beacons, RFID transceivers, NFC transceivers, Wi-Fi transceivers, cellular transceivers, wired network connections, etc. As such, in one embodiment, the communication between the mobile device 600 and the battery assembly 100 can be facilitated by and connected to a cloud-based system via RFID and Wi-Fi connections on the battery assembly 100. In another embodiment, the communication can be facilitated by and connected to a cloud-based system via Wi-Fi only. In another embodiment, the communication can be facilitated by and connected to a cloud-based system via cellular transceivers. In yet another embodiment, the communication can be facilitated by and connected to a cloud-based system via Bluetooth and cellular transceivers. In still another embodiment, the communication can be facilitated by and connected to a cloud-based system and used with a self-vending system with which customers or operators can interact to rent the battery assemblies 100. In all such embodiments, the cloud-based system can be made accessible to a third party, such as a consumer and/or rental company.

The battery assembly 100 may include one or more circuits configured to monitor the state of the battery assembly 100 or other aspects of the equipment with which the battery assembly 100 is used. A circuit may be further configured to monitor the state of the battery to predict the number of starts capable with the battery. For example, a circuit may monitor the state of charge of the battery, the average amount of power expended to start and run the equipment, and/or other characteristics of the equipment (e.g., run state, RPMs, etc.). The average amount of power expended to start the equipment and/or characteristics of the equipment may be communicated to the circuit through one or more of the terminals coupling the battery assembly 100 to the receiver. The number of starts capable with the battery assembly 100 may then be shown on a display integrated into the battery (e.g., the display 420 shown in FIG. 7) or a display provided elsewhere, such as on a control panel or user interface. The number of starts capable with the battery assembly 100 may also be communicated to the mobile device 600 and displayed on a user interface of the mobile device 600. The number of starts capable with the battery assembly 100 may be calculated based on the characteristics of the equipment, for example, a battery having a specific charge may be able to perform more starts for one type of outdoor power equipment (e.g., a pressure washer) than for another type of outdoor power equipment (e.g., a lawn mower).

A circuit may be further configured to monitor other characteristics of the equipment by communicating with sensors and monitoring devices (e.g., fluid level sensors, temperature sensors, pressure sensors, chronometers, etc.). The circuit may output data related to the information received from the sensors and monitoring devices to a display, such as the display 420 (FIG. 7) integrated into the battery assembly 100 or a display shown on a user interface of a mobile device 600. The display may therefore communicate to the user of the equipment various operational data related to the equipment and the battery assembly 100. For example, the circuit may output to the display information such as operational time, battery charge, or battery temperature. Additionally, the circuit may monitor the temperature of the battery assembly 100 via an input from a temperature sensor. Temperature monitoring can be used to alert the user (e.g., via the display 420, user interface of the mobile device 600) if the battery temperature is too low for normal use of the battery. Using the battery assembly 100 to power these circuits allows information to be provided to the user (e.g., battery temperature, battery charge level) prior to the equipment being started so that any issues can be addressed before attempting to start the equipment.

Figure 12:
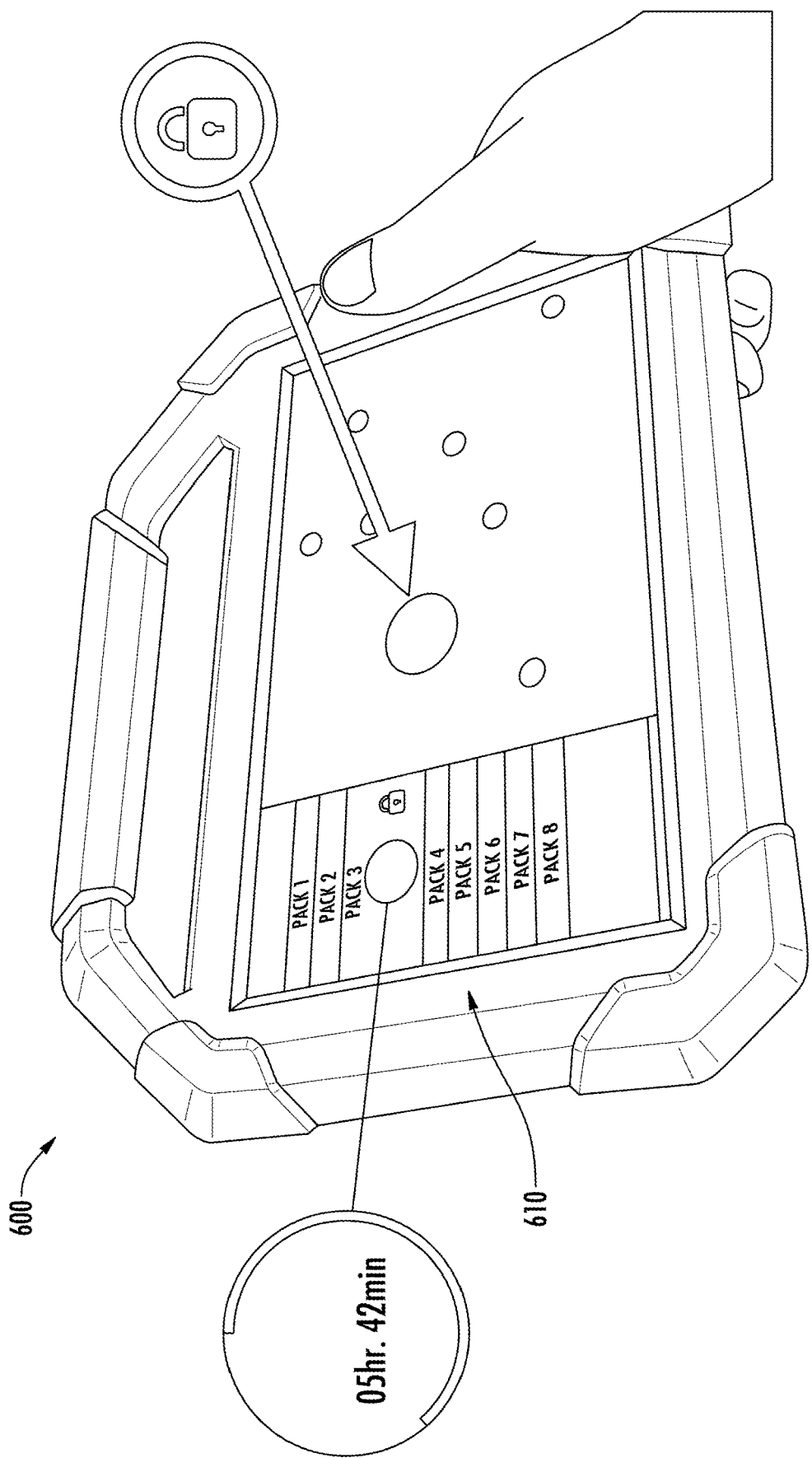
FIG. 12 is a front view of a light tower, according to an exemplary embodiment.

Referring to FIG. 12, a mobile device 600 displaying a user interface 610 is shown. The user interface 610 displays data received from the battery assembly 100 remotely. The user interface 610 displays, among other data, information relating to battery runtime, battery health, and battery location (e.g., using a Global Positioning System on the battery assembly 100). The user interface 610 may allow an employee and/or operator to remotely lock out the battery assembly 100 such that the battery assembly 100 will not operate to provide power. In this way, the battery assemblies 100 can be tracked and shut down if a theft is determined to likely have occurred. In addition, using remote tracking and operation, an employee of a rental company can lock out the battery assembly 100 when a rental period expires. The operator of the battery assembly 100 can then be prompted via an application on their own mobile device whether they would like to extend the rental period and can do so remotely. By interacting with an application displayed on an operator's mobile device, the operator can also preemptively extend the rental period, transmitting a notification to the rental company and/or employee of the rental company.

Figure 13:
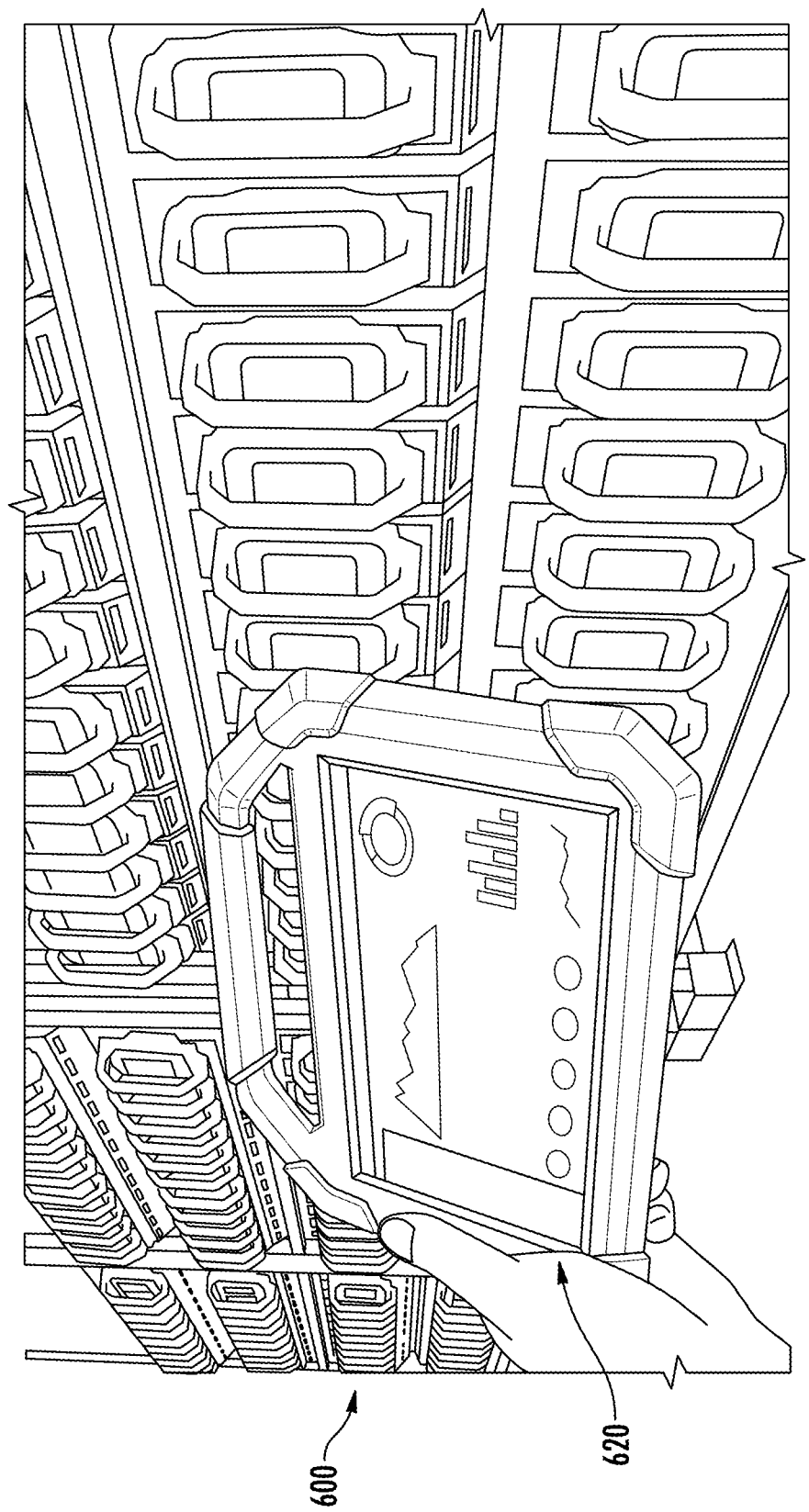
FIG. 13 is a perspective view of a backpack blower, according to an exemplary embodiment.

Referring to FIG. 13, a mobile device 600 displaying another user interface 620 is shown. The user interface 620 displays battery assembly charge and health data. An operator or employee of a rental service may use the user interface 620 to track the battery charge levels across multiple battery assemblies 100 to determine which of the battery assemblies 100 may be fully charged and thus, ready to use and/or rent out. In addition, the battery assemblies 100 can be chosen for certain pieces of equipment based on various parameters associated with the battery assemblies 100, such as State of Health (SoH), State of Charge (SoC), the amount of charge on the battery, etc. For example, a piece of equipment that requires less battery charge may be able to use a battery assembly 100 with less charge than a piece of equipment that requires a fully charged battery for practical use. A rental company may track the charge of the battery assemblies 100 to determine whether to rent out a particular battery assembly 100 to a customer based on which equipment the operator is desiring to use the battery assembly 100. The user interface 620 may also display other health characteristics, such as which battery assemblies 100 may be failing to charge properly.

In some embodiments, a user can reserve a battery assembly 100 prior to arriving at a rental company using their mobile device. Upon arriving at the rental company, the user is directed to the proper battery assembly 100 (e.g., a particular battery assembly 100) by a display on their mobile device. For example, the mobile device may display a map of the rental company store and indicate where the battery assembly 100 is located within the store. The mobile device may additionally or alternatively display text indicating which part of the store the battery assembly 100 is located. Once locating the proper battery assembly 100, the user can use their mobile device (e.g., via NFC, Bluetooth, etc.) to communicate with the battery assembly 100 to perform a check out procedure. By using the mobile device to check out the battery assembly 100, mobile device information (e.g., unique code transmitted by the mobile device, etc.) is communicated to the battery assembly 100 and the user is authenticated via their mobile device. Up until the point where the user is authenticated and checks out the battery assembly 100, the battery assembly 100 can remain locked.

Figure 14:
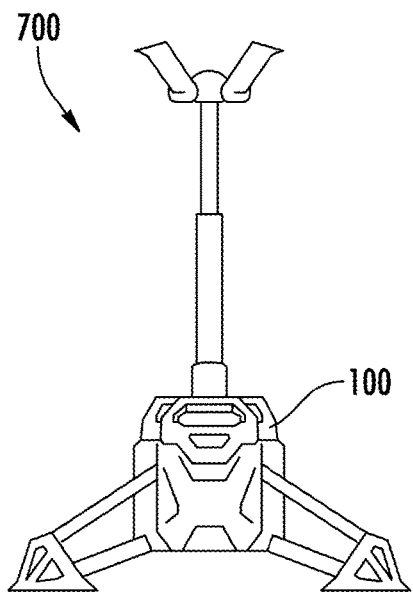
FIG. 14 is a perspective view of a generator, according to an exemplary embodiment.
Figure 15:
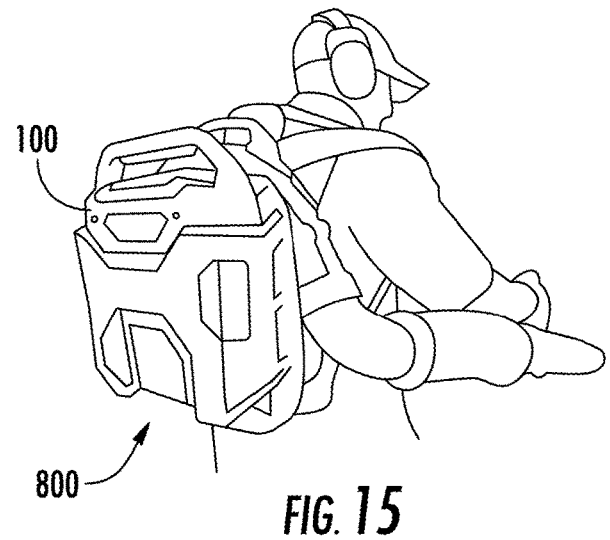
FIG. 15 is a perspective view of a user interface of a mobile device.
Figure 16:
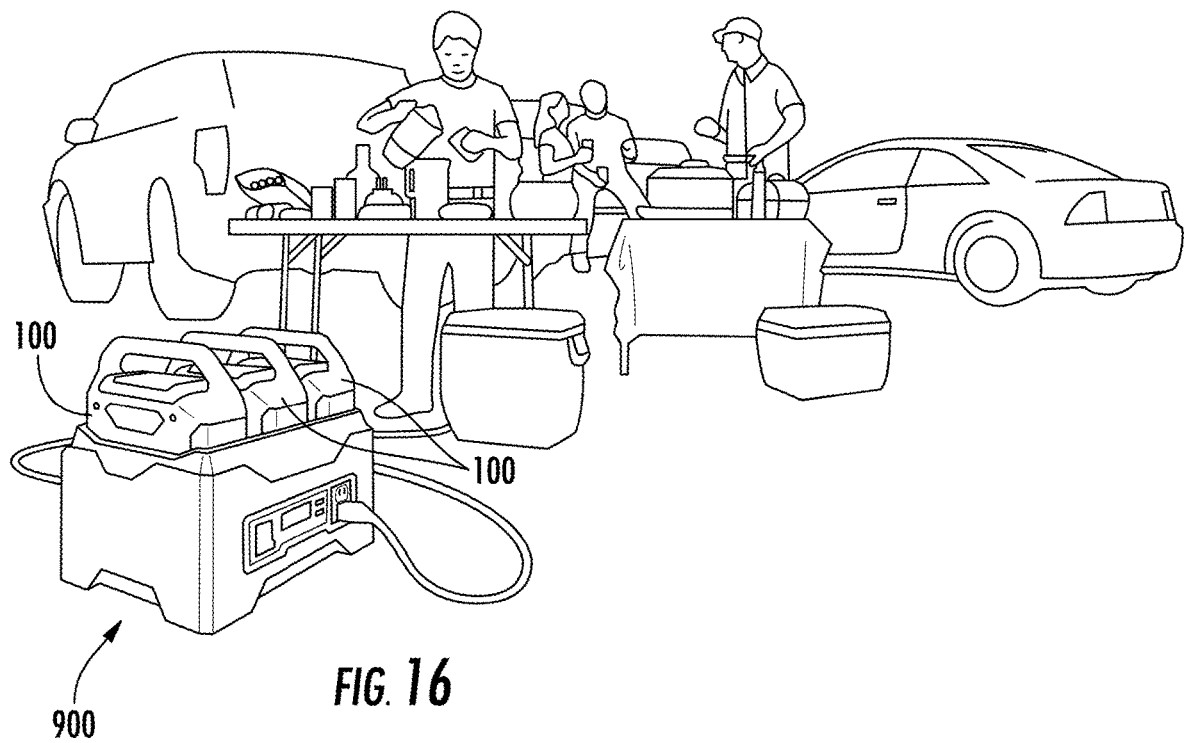
FIG. 16 is a perspective view of a user interface of a mobile device.

Referring to FIG. 14, the battery assembly 100 is shown in use on a light tower 700. The battery assembly 100 may be positioned in a base of the light tower 700. Accordingly, the light tower 700 may be easily transportable for use at construction sites, etc. Referring to FIG. 15, the battery assembly 100 is shown in use on a backpack blower 800. The battery assembly 100 is positioned within the backpack portion of the backpack blower 800 such that an operator carries the battery assembly 100 on his or her back while using the blower 800. Accordingly, the blower 800 is easily transportable. Referring to FIG. 16, three battery assemblies 100 are shown in use with a generator 900. As such, the battery assemblies 100 can be used to power a generator 900 and an operator can plug equipment and/or other electrical devices into the generator 900 to power such equipment remote from a power grid.

Figure 17:
FIG. 17 is a perspective view of various pieces of indoor and outdoor power equipment using the battery of FIG. 2.

Referring to FIG. 17, various types of equipment that can use one or more battery assemblies 100 are shown. As shown, the battery assembly 100 can be used with various types of indoor and outdoor power equipment, as well as with portable jobsite equipment. Examples of such equipment are floor sanders, floor buffers and polishers, cement rollers, power washers, vacuums, overseeders, sweepers, sod cutters, brush mowers, portable generators, heaters, etc.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination.

It should be understood that while the use of words such as desirable or suitable utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," or "at least one" are used there is no intention to limit the claim to only one item unless specifically stated to the contrary in the claim.

It should be noted that certain passages of this disclosure can reference terms such as "first" and "second" in connection with side and end, etc., for purposes of identifying or differentiating one from another or from others. These terms are not intended to merely relate entities (e.g., a first side and a second side) temporally or according to a sequence, although in some cases, these entities can include such a relationship. Nor do these terms limit the number of possible entities (e.g., sides or ends) that can operate within a system or environment.

The terms "coupled" and "connected" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

What is claimed is:

1. A battery assembly comprising:
   a battery pack having a battery pack housing;
   an upper modular portion coupled to the battery pack housing positioned at a first end of the battery pack housing;
   a lower protector portion coupled to the battery pack housing positioned at a second end of the battery pack housing;
   a handle formed as part of the upper modular portion;
   a plurality of battery cells disposed within the battery pack housing;

a mating feature comprising a plurality of ports electrically connected to the plurality of battery cells and structured to supply power from the plurality of battery cells through the ports, the mating feature structured to selectively connect the battery assembly with a receptacle of at least one of a piece of power equipment and a charging station;

wherein the mating feature is located on a side of the battery pack housing, wherein the handle comprises a movable member structured to releasably couple the battery assembly to at least one of the piece of power equipment and the charging station when the movable member is depressed, and wherein the movable member is positioned on an inner surface of the handle.

2. The battery assembly of claim 1, further comprising one or more slots positioned on the battery pack housing and structured to receive one of a plurality of protrusions of the receptacle of at least one of the piece of power equipment and the charging station.

3. The battery assembly of claim 1, wherein the battery assembly comprises a heat sink positioned at least partially within the battery pack housing and structured to dissipate heat from the battery assembly.

4. The battery assembly of claim 1, wherein the mating feature comprises a slot structured to interface with a protrusion on the charging station to releasably couple the battery assembly to the charging station.

5. The battery assembly of claim 1, further comprising one or more circuits structured to monitor a state of the battery assembly and output data related to the state of the battery to at least one of a display integrated with the battery assembly and a mobile device.

6. The battery assembly of claim 1, further comprising one or more circuits structured to monitor characteristics of a piece of equipment to which the battery assembly is coupled and output data related to the state of the piece of equipment to at least one of a display integrated with the battery assembly and a mobile device.

7. A battery charging system comprising:
a charging station comprising a plurality of receptacles;
a plurality of battery assemblies wherein each of the plurality of battery assemblies comprises:
a housing comprising a handle;
a first lower protector portion and a second lower protector portion both being coupled to an outer portion of the housing, wherein the second lower protector portion is located opposite the first lower protector portion;
a plurality of battery cells disposed within the housing;
a mating feature integrally formed with the housing, wherein the mating feature is structured to selectively couple the battery assembly with the receptacle of the charging station and comprises a plurality of ports electrically connected to the plurality of battery cells and structured to receive power from the charging station to charge the plurality of battery cells.

8. The battery charging system of claim 7, wherein each of the plurality of battery assemblies further comprises:
a lower housing modular portion; and
an upper housing modular portion;
wherein a slot is formed on the housing and structured to receive one of a plurality of protrusions of the receptacles.

9. The battery charging system of claim 7, wherein the handle comprises a movable member structured to selectively disengage the battery assembly from the plurality of receptacles of the charging station and the movable member is positioned on an inner surface of the handle.

10. The battery charging system of claim 7, wherein the charging station is structured to sequentially charge the plurality of battery assemblies and is structured to determine one or more of the plurality of battery assemblies that have less charge than other battery assemblies and charge the one or more of the plurality of battery assemblies and switch off power supply to the other battery assemblies.

11. The battery charging system of claim 7, wherein each of the plurality of battery assemblies further comprises one or more circuits structured to monitor a state of the battery assembly and output data related to the state of the battery to a display integrated with the battery assembly.

12. The battery charging system of claim 7, further comprising a plurality of indicator lights configured to indicate a status of each of the plurality of battery assemblies when the plurality of battery assemblies are electrically coupled to the plurality of receptacles.

13. A battery assembly comprising:
a housing;
a first lower protector portion, a second lower protector portion, and an upper modular portion, each of the first lower protector portion, the second lower protector portion, and the upper modular portion is coupled to the housing, wherein the second lower protector portion is located opposite the first lower protector portion;
a handle located above the upper modular portion;
a plurality of battery cells disposed within the housing;
a mating feature comprising a plurality of ports electrically connected to the plurality of battery cells and configured to supply power from the plurality of battery cells through the ports and is configured to selectively connect the battery assembly with a receptacle of at least one of a power equipment and a charging station;
wherein the mating feature is located on a side of the housing.

14. The battery assembly of claim 13, further comprising one or more circuits structured to monitor a state of the battery assembly and output data related to the state of the battery assembly to at least one of a display integrated with the battery assembly and a mobile device.

15. The battery assembly of claim 13, further comprising one or more circuits structured to monitor characteristics of a piece of equipment to which the battery assembly is coupled and output data related to the state of the piece of equipment to at least one of a display integrated with the battery assembly and a mobile device.

16. The battery assembly of claim 13, further comprising a movable member positioned on an inner surface of the handle and structured to releasably couple the battery assembly to one of a piece of equipment and a charging station.

17. The battery assembly of claim 13, wherein the battery assembly comprises a heat sink positioned at least partially within the housing and configured to dissipate heat from the battery assembly.

18. The battery assembly of claim 13, wherein the mating feature comprises a slot configured to interface with a protrusion on the charging station to releasably couple the charging station and the mating feature of the battery assembly.

* * * * *